United States Patent [19]

Windsor

[11] 4,432,445

[45] Feb. 21, 1984

[54] CLUTCH CONTROL SYSTEMS

[75] Inventor: Harry M. Windsor, Leamington Spa, England

[73] Assignee: Automotive Products Limited, Leamington Spa, England

[21] Appl. No.: 268,807

[22] Filed: Jun. 1, 1981

[30] Foreign Application Priority Data

Nov. 4, 1980 [GB] United Kingdom ............... 8035377

[51] Int. Cl.$^3$ .............................................. B60K 41/02
[52] U.S. Cl. .............................. 192/0.076; 192/103 F
[58] Field of Search ............... 192/0.096, 0.075, 0.076, 192/0.033, 0.032, 103 R, 103 F; 361/236, 239; 123/440, 340, 376

[56] References Cited

U.S. PATENT DOCUMENTS

| | | | |
|---|---|---|---|
| 3,648,808 | 3/1972 | Kato | 192/0.033 |
| 4,023,660 | 5/1977 | Dickinson | 192/0.075 |
| 4,282,780 | 8/1981 | Totani et al. | 74/866 |
| 4,319,658 | 3/1982 | Collonia et al. | 123/340 |

FOREIGN PATENT DOCUMENTS

1427039 3/1976 United Kingdom .
1449543 9/1976 United Kingdom .
1120132 7/1978 United Kingdom .

*Primary Examiner*—George H. Krizmanich
*Attorney, Agent, or Firm*—Kemon & Estabrook

[57] ABSTRACT

A vehicle automatic clutch control has an engine speed sensor that produces an electrical signal indicative of engine speed, an electrical reference signal generator that produces a reference signal, a throttle position sensor that produces a signal indicative of throttle opening. The throttle signal is summed with the reference signal to produce a modified reference signal which is then compared with the engine speed signal by a comparator that produces an error signal. The error signal is used for controlling a clutch actuator that operates the clutch to vary the engagement of the clutch to alter the engine speed and equalize the modified reference signal and engine speed signal and thus maintain a substantially constant engine speed until the clutch is fully engaged.

7 Claims, 7 Drawing Figures

CLUTCH CONTROL SYSTEMS

This invention relates to clutch control apparatus for the automatic control of friction clutches between the engine and transmission of motor vehicles on take-up from a standing start.

In pending US Application of Norris et al. Ser. Nos. 235,581 filed Feb. 18, 1981, there is described a control apparatus comprising an engine speed sensor that produces an engine speed signal, an electrical reference signal generator that produces a reference signal, and a comparator that processes the two signals to produce an error signal. The error signal is utilised for controlling a clutch actuator that operates the clutch to vary the state of engagement of the clutch with the engine to alter the engine speed and equalise said engine speed and reference signals and this maintains a substantially constant engine speed until the clutch is fully engaged.

A problem that we have encountered is that during moments of high torque demand eg. a hill start or a standing start when towing a caravan, then it is better for the clutch not to engage until a high engine speed is attained, otherwise the vehicle may stall. Further, once the clutch has engaged and the vehicle starts to move off then should the engine speed start to fall, say for example, because the vehicle is going up an incline, then we do not wish the clutch to start to disengage to equalise the various electronic signals, as described above.

Accordingly there is provided a vehicle transmission clutch control apparatus comprising an electrical reference signal generator, an engine speed sensor and signal means, a throttle position sensor which produces a signal indicative of throttle opening, a summing junction for summation of the throttle signal and reference signal, a comparator for receiving the modified reference signal, and for comparing the modified reference signal and engine speed signal to produce an error signal which is utilised for operating a clutch position control so that the state of engagement of the clutch is controlled to equalise the modified reference and engine speed signals until the clutch is fully engaged.

Preferably the apparatus includes a switching circuit connected between the error signal and the throttle signal so that when the circuit is energised by the error signal exceeding a predetermined value, the switching circuit output signal is fed into the throttle signal.

Conveniently a choke position indicator provides a choke signal which is utilised to alter the input signal according to the degree of choke, preferably in a manner proportional to the strength of the signal.

The invention will be described by way of example and with reference to the accompanying drawings in which.

Figure 1:
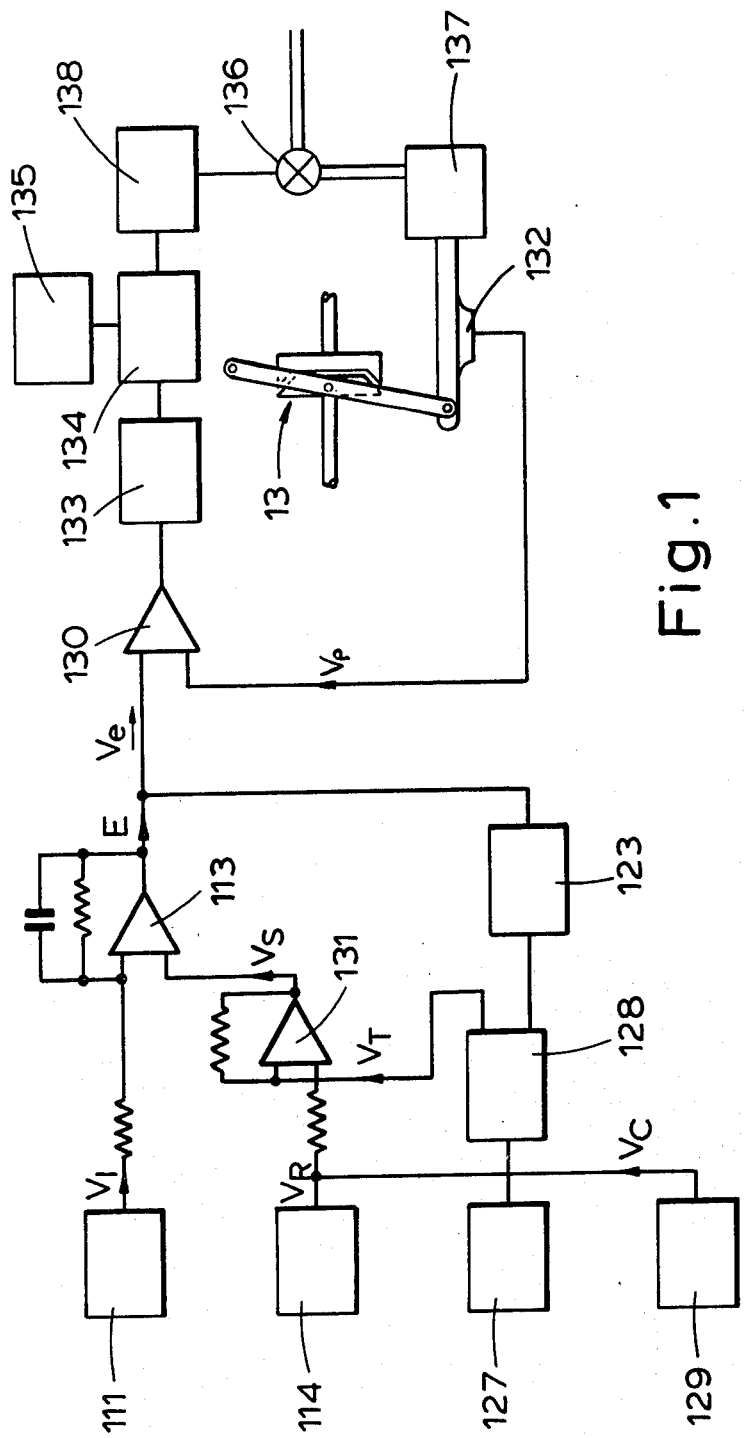
FIG. 1 is a schematic drawing of one embodiment of the invention.

In FIG. 1 is illustrated a control apparatus that causes the reference signal to vary. Further the system operates so that once the clutch has engaged and the vehicle starts to move off then should the engine speed fall, say for example, because the vehicle is going up an incline, then the clutch will not be caused to disengage to equalise the reference and engine speed signals but will remain engaged below the reference until a predetermined minimum engine speed is reached.

Figure 2:
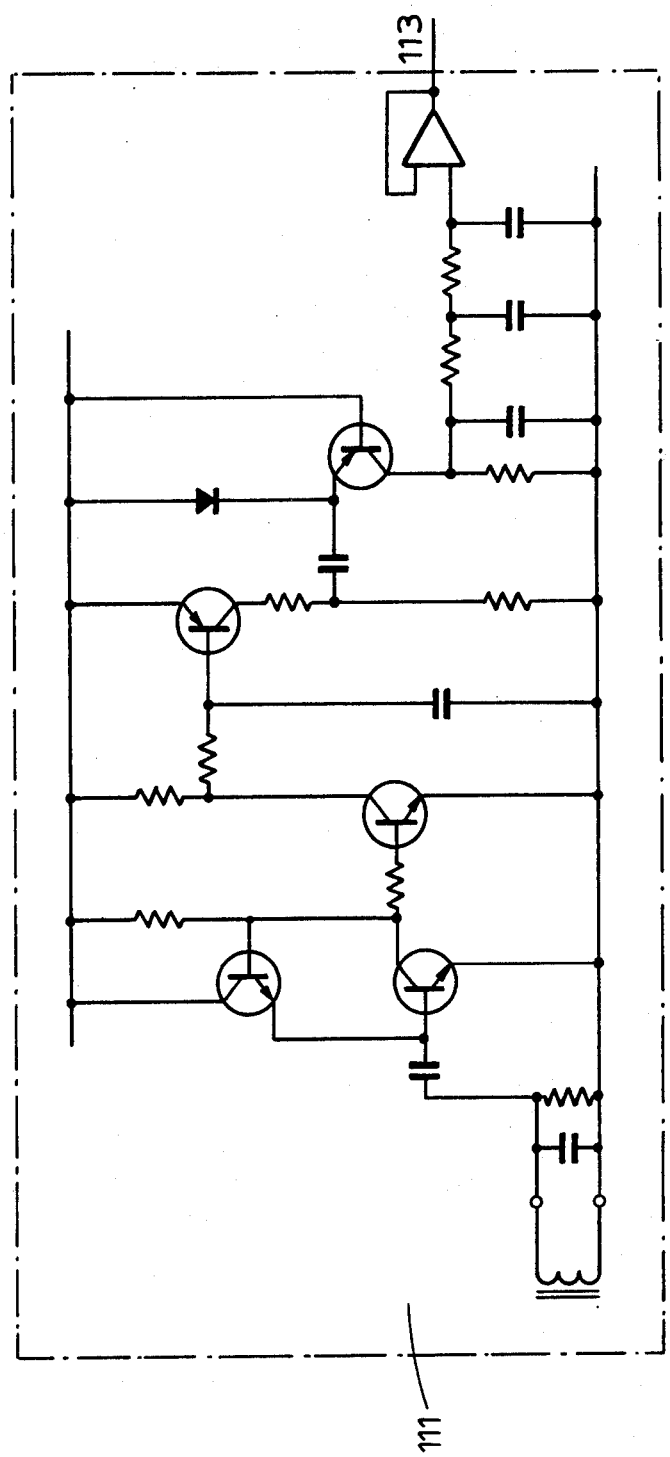
FIG. 2 is a detailed circuit of the engine speed sensor.

The vehicle engine speed is sensed by a sensor 11 that produces a voltage signal $V_1$ proportional to engine speed. The electrical circuit of the sensor is illustrated in detail in FIG. 2 but is basically a magnetic probe sensing the teeth on the engine flywheel and a transistor pump circuit.

The vehicle throttle position is sensed by a transducer 127 which is a variable potentiometer that produces a signal $V_T$ proportional to the throttle opening. The signal $V_T$ can be a positive signal which has a value proportional to throttle opening ie. small value at light throttle and large value at full throttle. Alternatively, as is utilised in the embodiment herein, the signal $V_T$ can be proportional to throttle closure ie. at light throttle opening the signal is at a maximum and at full throttle opening the signal has a minimum value. This relationship can be written as signal $V_T = k\,(1\text{-throttle opening})$. The inverse relationship between the signal $V_T$ and the throttle opening is utilised because the signal $V_T$ is required in this form to control other functions in the vehicle gearbox.

The throttle position transducer 127 is connected to a limiter 128 the action of which is to allow the throttle signal $V_T$ to vary only over a limited range say 10% to 50% of the throttle opening.

Figure 3:
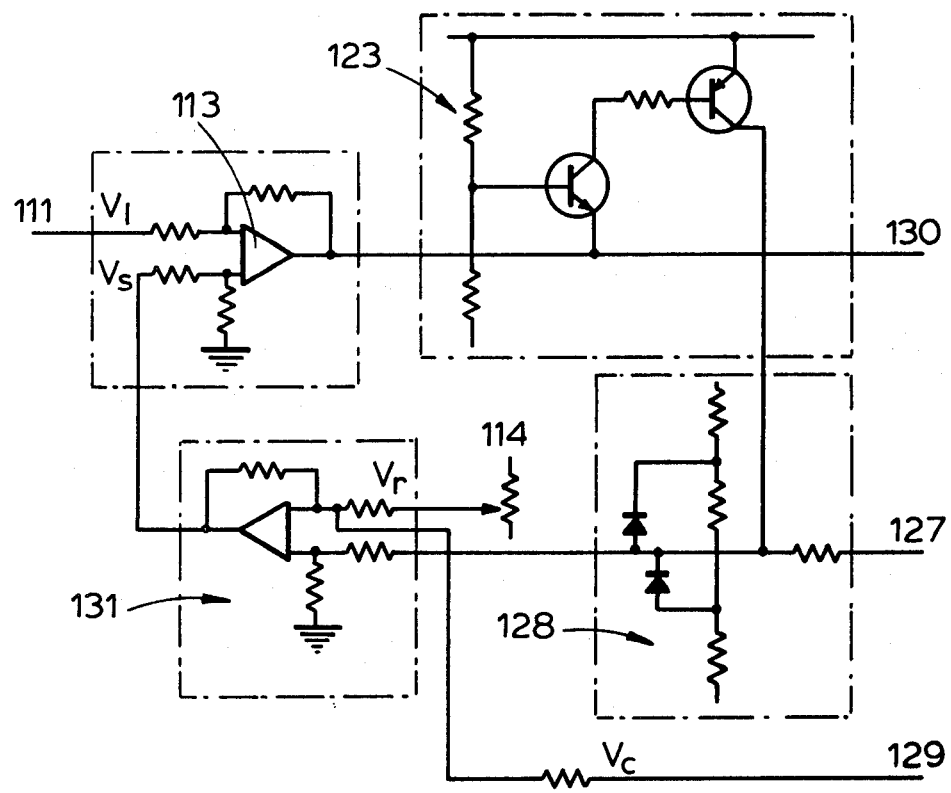
FIG. 3 is a detailed circuit of the limiter and switching circuit utilised in FIG. 2 shown in their relationship to the difference amplifier 131 and comparator 113.
Figure 4:
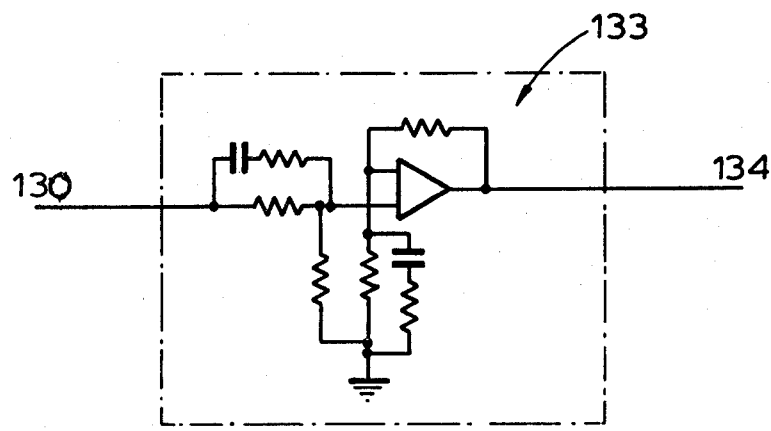
FIG. 4 is a detailed circuit of the phase-gain shaping network in FIG. 1.
Figure 5:
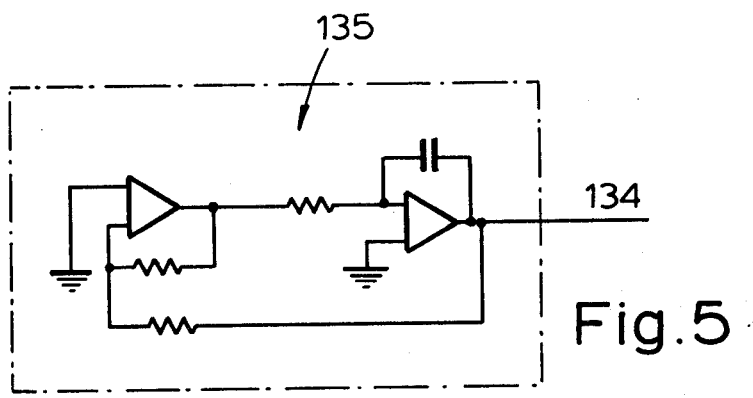
FIG. 5 is a detailed circuit of the oscillator of FIG. 1.
Figure 6:
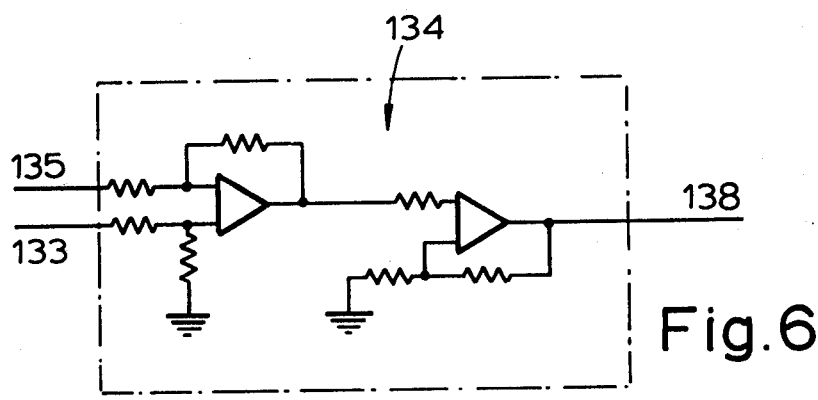
FIG. 6 is the mark spacer ratio modulator of FIG. 1.
Figure 7:
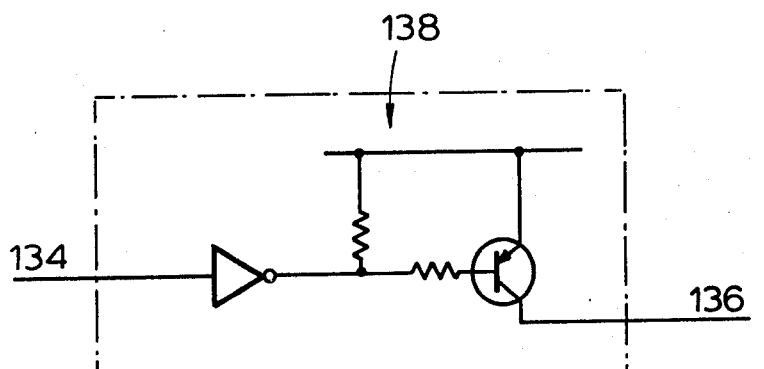
FIG. 7 is an output as is used in FIG. 1.

The limiter 128 is disclosed in detail in FIG. 3 of the accompanying drawings. The signal $V_T$ is fed into an inverting input of a difference amplifier 131. The difference amplifier 131 also receives a predetermined steady reference signal voltage $V_R$ from a reference signal generator 114.

The reference signal generator 114 is a potentiometer across the vehicle battery and can be set so that the reference voltage is the same as a signal obtained via the sensor 111 at a particular engine speed eg. 1000 rpm. Because the throttle transducer 127 is connected in the reverse sense, producing maximum voltage for closed throttle conditions, the difference amplifier 131 acts as a summing junction to add the signals $V_T$ and $V_R$ together and produce a resultant modified reference signal $V_S$ which is fed into a comparator 113.

The comparator 113 receives the engine speed signal $V_1$ and the modified reference signal $V_S$ and measures the difference between the two signals $V_1$ and $V_S$ to produce an error signal E.

The error signal E is positive when $V_1$ is less than $V_S$ and becomes negative when $V_1$ exceeds $V_S$. The throttle transducer signal $V_T$ is utilised to modify the speed of the engine at which the error signal E changes from positive to negative.

The error signal E derived from the comparator 113 is fed into a clutch position control which controls the operation of hydraulic actuator 137, which operates the vehicle clutch 13.

The clutch position control comprises a comparator 130 that receives the error signal E and a signal $V_P$ from a travel transducer 132 responsive to the clutch position. The position transducer 132 is coupled to the actuator 137 output and produces the signal $V_P$ which is representative of clutch positions. This signal $V_P$ is compared with error signal E in comparator 130 and the difference signal $V_E$ is used to control the clutch position. The signal $V_E$ from the comparator 130 is then fed into a phase-gain shaping network 133, introduced to ensure the system stability, a mark space ratio modulator and oscillator, 134 and 135 respectively, and then utilised via an output 138 to control a solenoid operated hydraulic valve 136. The hydraulic valve 136 controls the hydraulic pressure in a hydraulic actuator 137. The mark space ratio of the signal fed into the solenoid valve 136 determines the hydraulic pressure in the actuator and hence the state of engagement of the clutch.

The shaping network 133, oscillator 135, and mark space ratio network and output 138 are shown in detail in FIGS. 4 to 7 respectively. For the ease of understanding FIG. 2 to 7, the electrical terminals on each component are numbered according to the component to which they are connected eg. in FIG. 2 the terminal 113 connects the engine speed sensor 111 to the comparator 113.

The clutch position control causes the actuator 137 to operate to equalise the position signal $V_P$ and the error signal E and reduce the difference signal $V_E$ to zero. Consequently the actuator 137 takes up a position dictated by the error signal E.

The error signal E determines the degree of engagement of the clutch. The clutch position control operates the actuator 137 so as to vary the state of engagement of the clutch 13 with the vehicle engine and thereby alter the engine speed to cause the engine speed signal $V_1$ to approach equivalence with the modified reference signal $V_S$ and make the error signal E approach zero. Hence for a given throttle opening it is possible to arrive at the condition where $V_1 = V_S$ at which point the clutch will be tending to slip. Once the clutch is fully engaged the engine speed will rise above the reference and hold the clutch fully engaged.

A choke position indicator 129 produces a signal $V_C$, preferably but not necessarily proportional to the degree of choke. The signal $V_C$ is combined with the reference signal $V_R$ prior to the reference signal being combined with the throttle position signal $V_T$. Hence if a degree of choke is required for starting the vehicle then the modified reference signal $V_S$ is increased by the signal $V_C$ and the engagement speed for the clutch is increased to accommodate the higher idling speed of the engine.

The clutch control apparatus operates generally as follows:

When the engine speed signal $V_1$ is lower than the modified reference signal $V_S$, the error signal E is positive and the clutch is disengaged. When $V_1 = V_S$ the error signal is zero and the clutch is partially engaged and when $V_1$ is greater than $V_S$ the error signal E is negative and the clutch is fully engaged. During the engagement of the clutch the control apparatus operates to vary the engagement of the clutch so that the engine speed signal and modified reference signals are substantially equal ie. error signal $=0$. The range of engine speed over which engagement takes place is determined by the overall system amplification. The degree of exactitude with which the error signal E approaches zero is determined by the gain in the system, ie. the higher the gain the greater the exactitude. In addition, engagement of the clutch will load the engine, resulting in a reduction of speed and consequently more gradual clutch engagement.

From a standing start when the vehicle engine is idling, the engine speed signal voltage $V_1$ is below the modified reference signal voltage $V_S$ giving rise to a positive error signal E. If the drive places the gear shift lever into first gear then as the driver increases the engine speed so the signal $V_1$ approaches the modified reference signal $V_S$ and the error signal E approaches zero. As $V_1$ exceeds $V_S$ the error signal E becomes negative. This causes the clutch control to operate the actuator 137 to move the clutch 13 into engagement with the engine to increase the torque load upon the engine through the friction clutch thereby reducing the engine speed and bringing $V_1$ closer to $V_S$ and reducing the error signal to zero.

The driver will recognise the fall in engine speed and further open the throttle, hence increasing $V_1$ which in turn causes the clutch to further engage, and reduce the engine speed and so on. This process of increasing the throttle opening and holding the engine speed steady by engagement of the clutch will continue until the clutch is fully engaged.

The slow increase in the state of engagement of the clutch ensures a smooth take-up of the clutch, and hence a smooth starting by the vehicle. When the vehicle is moving and the clutch fully engaged the engine speed will rise as the driver increases the throttle opening and the error signal is fully negative and holds the clutch fully engaged.

The throttle transducer signal $V_T$ is utilised to modify the speed of the engine at which the error signal E changes from positive to negative.

At a moment of high torque demand eg. on a hill start when $V_T$ is a at a high value (because the throttle is half open), since $V_S = V_T + V_R$ then $V_1$ must correspond to a high value of engine speed e.g., 1500 rpm. before the error signal is changed from positive to negative and therefore the engine speed is increased before the clutch is operated.

Whereas for normal starts when $V_T$ is equivalent to small throttle openings $V_S = V_R + 0$ ie. about 1000 rpm. said signal $V_R$ is set as earlier described for 1000 rpm.

A switching circuit 123 is connected between the error signal E and the throttle signal $V_T$. When the negative value of error signal E exceeds a predetermined amount the switching circuit is actuated. The switching circuit is shown in detail in FIG. 3 of the accompanying drawings. The switching circuit 123 changes the throttle signal $V_T$ to a value corresponding to a light throttle opening. When in the un-energised state the switching circuit has no loading effect on the signal $V_T$. Once the switching circuit has operated and the reference signal clamped to the light throttle value, the error signal increases, and consequently ensures that the reference signal remains clamped until the engine speed is reduced to that corresponding to the light throttle take-up value.

The effect of this is that on vehicle take-off on a hill when the clutch engages $V_1 = V_R + V_T$ at say 1500 rpm as the engine speed increases the the E becomes negative, then if for some subsequent reason the engine speed drops the clutch will not disengage until the engine speed falls below 1000 rpm.

I claim:

1. A vehicle transmission clutch control system for a vehicle having an engine, a transmission and a friction clutch interposed therebetween, the clutch being selectively engagable for establishing a driving connection between engine and transmission, thereby to load the engine and control engine speed, the control system comprising:

an engine speed sensor;

means for producing an electrical engine speed signal derived from the engine speed sensor;

generator means for producing an electrical reference signal;

a throttle position sensor which produces a throttle signal indicative of throttle position;

means for the summation of the throttle signal and reference signal to produce a modified reference signal;

comparator means arranged to receive and compare the modified reference signal and engine speed signal and produce a consequent error signal;

a clutch actuator that operates the clutch to vary the degree of engagement of the clutch; and a control means responsive to said modified error signal and controlling the actuator to control the state of engagement of the clutch to control the load on the engine so as to equalize said engine speed signal and modified reference signal until the clutch is fully engaged.

2. A control as claimed in claim 1, wherein a choke position indicator provides a choke signal which is utilised to alter the reference signal according to the degree of choke.

3. A control as claimed in claim 2, wherein the choke signal is added to the reference signal prior to the reference signal being summed with the throttle signal.

4. A control as claimed in any one of claims 1 to 3, wherein a switching circuit is connected between the error signal and the throttle position signal so that when the switching circuit is energised by a predetermined imbalance between the engine speed signal and the modified reference signal, the switching circuit output signal is then utilised to modify the throttle signal and cause the clutch position control to remain in the clutch engaged state until the engine speed signal drops to a given value.

5. A control as claimed in claim 1, wherein a limiter is interposed between the throttle position sensor and the means for summation of the throttle and reference signals so as to allow the throttle signal to vary over a limited range of throttle opening.

6. A control as claimed in claim 5, wherein the range is 10% to 50% of throttle opening.

7. A control as claimed in claim 4, wherein a limiter circuit is interposed between the throttle position sensor and the means for summation of the throttle and reference signals so as to receive the output signals from the switching circuit.

* * * * *